US006738482B1

(12) United States Patent
Jaber

(10) Patent No.: US 6,738,482 B1
(45) Date of Patent: May 18, 2004

(54) NOISE SUPPRESSION SYSTEM WITH DUAL MICROPHONE ECHO CANCELLATION

(75) Inventor: Marwan Jaber, North-Montreal (CA)

(73) Assignee: Jaber Associates, LLC, Montreal (CA)

( * ) Notice: Subject to any disclaimer, the term of this patent is extended or adjusted under 35 U.S.C. 154(b) by 686 days.

(21) Appl. No.: 09/669,380

(22) Filed: Sep. 26, 2000

(51) Int. Cl.[7] .............................................. H04B 15/00

(52) U.S. Cl. ......................... 381/94.7; 381/92; 381/66; 379/406.01; 379/406.04; 379/406.06; 379/406.08; 379/406.09

(58) Field of Search .......................... 381/94.7, 92, 66; 379/406.01, 406.05, 406.06, 406.08, 406.02, 406.04, 406.09

(56) References Cited

U.S. PATENT DOCUMENTS 5,690,321 A 11/1997 Seni et al.
5,740,256 A 4/1998 Castello Da Costa et al.
5,754,665 A * 5/1998 Hosoi ........................ 381/94.1
5,917,921 A * 6/1999 Sasaki et al. .............. 381/94.1
6,084,973 A * 7/2000 Green et al. .................. 381/92
6,487,295 B1 * 11/2002 Lofgren et al. .......... 381/71.12

FOREIGN PATENT DOCUMENTS

EP 0 411 360 A 2/1991
EP 0 729 288 A 8/1996
EP 0 856 834 A 8/1998

* cited by examiner

*Primary Examiner*—Xu Mei
*Assistant Examiner*—Justin Michalski
(74) *Attorney, Agent, or Firm*—Allan Jacobson

(57) ABSTRACT

An active noise suppression system for use in noisy environments includes a dual microphone noise suppression system in which the echo between the two microphones is substantially canceled or suppressed. Noise is cancelled by the use of first and second line echo cancellers, which model the delay and transmission characteristics of the acoustic path between the two microphones. In a first embodiment, a noise suppression system acts as an ear protector, canceling substantially all or most of the noise striking the dual microphones of the ear set. In a second embodiment, a noise suppression system in accordance with the present invention acts a noise suppression communication system, suppressing background noise while allowing speech signals to be heard by the wearer.

19 Claims, 7 Drawing Sheets

NOISE SUPPRESSION SYSTEM WITH DUAL MICROPHONE ECHO CANCELLATION

FIELD OF THE INVENTION

The present invention relates to the field of acoustic devices. In particular, the present invention relates to a noise suppression system for use in noisy environments.

BACKGROUND OF THE INVENTION

Many environments have unwanted noise. For example, factory machinery, aircraft engines, motor vehicle traffic and the like generate noise levels that can be detrimental to hearing and interfere with voice communication.

The primary component of unwanted noise is the direct sound wave d(t) from the noise source. The secondary component of unwanted noise is the echo of the direct sound wave off a reflecting surface, such as the exterior surface of a building or an interior wall. In open environments, noise is primarily direct noise. In a typical environment, there is some reflection (echo) of the primary sound wave off buildings or walls, which adds reflected noise to the original direct noise. In confined enclosed environments the interior surfaces and surfaces of objects contained inside the enclosed environment generate multiple echoes r(t) of the same sound wave. Multiple echoes of the reflected sound wave combined with the direct sound wave d(t) is the noise s(t) captured by the microphone.

One example of an environment in which reverberation noise is considered a significant problem is mining. Mines are typically located underground in closed quarters surrounded by reflecting walls of substantially homogenous materials. Powerful mining equipment generating acoustic waves is used on a daily basis. The noisy environment makes voice communication between mine workers very difficult. In addition, the accumulation of direct acoustic waves and their reverberation from the inner surfaces of the mine tunnel and other mining equipment in the tunnels leads to a high noise level detrimental to the ear. The risk of hearing loss after long exposure to high ambient noise levels has been well documented.

Noise Cancellation

Various devices have been proposed to reduce noise levels. One of the most direct means for reducing the sound intensity is to surround the source of the noise with acoustic baffles. Such baffles placed on or in front of reflecting walls and other objects, cut off the reflecting acoustic propagation path. Various absorbing materials dissipate incident sound energy by converting it to heat energy. Sound absorbers work well for the high frequency range. However, acoustic baffles are bulky and do not work well for low frequencies. In certain industrial environments such as mining, acoustic baffles are not practical.

Active noise cancellation, where the cancellation of noise is sought by emitting an artificial sound to cancel the unwanted sound, is known. An active noise cancellation system uses a microphone, an amplifier and a loud speaker, in an arrangement to cancel the sound in a particular area, typically the area in the vicinity of an operator. The microphone provides a measure of the noise in a local area relatively distant from the direct noise source. The amplifier drives the loudspeaker to produce equal amplitude and opposite phase acoustic signal to cancel out the sound in the local area. Although a significant sound reduction is experienced, it is experienced only for that particular area and no other areas where the sound may be equally objectionable. In addition, such an arrangement is prone to the production of interference patterns, which may even increase the noise intensity in other locations.

A variation of the above system includes a second microphone disposed at a noise receiving point. The output of the second microphone is a measure of the cancellation error, which is used to adjust the coefficients of an adaptive filter in a closed loop recursive system to further reduce the noise received at the second microphone.

In another type of active noise cancellation system a microphone is placed very close to the acoustic noise source, which is approximated a point source. The signal processing circuit produces a phase opposition signal, which is adjustable by adjusting the distance between the microphone and the loudspeaker. Such systems are restricted to a point source of acoustic radiation of a single frequency, and do not work well when the noise is produced by large vibrating surfaces that may be vibrating in a complex mode to produce a wide spectrum of frequencies.

Another type of active noise cancellation system uses a pair of microphones and a headset worn by the operator. A first microphone picks up a first sample of the background noise. A second microphone placed some distance away from the first microphone, picks up a second sample of the background noise. To cancel the noise, the signal from the second microphone is processed in an adaptive filter and combined in opposite phase relationship to the signal from the first microphone. The processed second signal from the second microphone tends to cancel the noise signal arriving at the first microphone. The headset actively reduces the level of noise reaching the ears, thereby providing ear protection for workers when worn in high noise areas. However, such headsets prevent workers from hearing alarm signals and block speech communication between workers.

In general, prior art noise cancellation systems do not work well in relatively high background noise environments with complex reverberating structures especially in confined spaces, such as are commonly found in the mining industry.

Enhancing Speech Communication

In addition to ear protection, noise suppression systems are used in communications systems to help workers hear speech signals in noisy environments. Noise reduction communication systems distinguish the desired speech component from the background noise component of the combined signal. By canceling or reducing the background noise component, the signal-to-noise ratio is increased thereby enhancing the quality of the received speech.

One type of noise suppression system uses a pair of microphones connected to a headset worn by the operator. A first microphone (for voice) picks up a first signal containing the intended speech plus the background noise. A second microphone (for noise) placed some distance away from the first microphone, picks up a sample consisting mostly of the background noise and less of the speech signal. The signal from the second microphone (background noise) is processed in an adaptive filter and subtracted from the signal from the first microphone (speech plus the background noise) to reduce or cancel the background noise component of the first signal.

Since the second microphone is placed some distance away from the first microphone, the background noise sample (at the second microphone) is not exactly the same background noise signal that is arriving at the first microphone. The function of the adaptive filter is to compensate for the difference in acoustic paths of background noise arriving at the first and second microphones.

U.S. Pat. No. 5,754,665 to Hosoi shows a dual noise canceller with dual microphones and dual adaptive filters intended for use in an automobile telephone speaker system. First and second microphones are placed near the driver and passenger, respectively. When one microphone is used for conversation, the other microphone is used for collecting noise, and vice versa. A noise-reduced version of the first voice signal is obtained by using one of the adaptive filters. When the second microphone is used for conversation, the first microphone is used for collecting noise. A noise-reduced version of the second voice signal is obtained by using the second adaptive filter. The two noise reduced versions are added to form the outgoing telephone voice signal.

SUMMARY OF THE INVENTION

In order to cancel unwanted noise, it is necessary to obtain an accurate estimate of the noise to be cancelled. In an open environment, where the noise source can be approximated as a point source, microphones can be spaced far apart as necessary and each will still receive a substantially similar estimate of the background noise. However in a confined environment containing reverberation noise caused by multiple sound reflections, the sound field is very complex and each point in the environment has a very different background noise signal. The further apart the microphones are, the more dissimilar the sound field. As a result, it is difficult to obtain an accurate estimate of the noise to be cancelled in a confined environment by using widely spaced microphones.

If the two microphones are moved closer together, the second microphone should provide a better estimate of the noise to be cancelled in the first microphone. However, if the two microphones are placed very close together, each microphone will cause an additional echo to strike the other microphone. That is, the first microphone will act like a speaker (a sound source) transmitting an echo of the sound field striking the second microphone. Similarly, the second microphone will act like a speaker (a sound source) transmitting an echo of the sound field striking the first microphone. Therefore, the signal from the first microphone contains the sum of the background noise plus a reflection of the background noise, which results in a poorer estimate of the background noise to be cancelled.

The present invention is embodied in a dual microphone noise suppression system in which the echo between the two microphones is substantially canceled or suppressed. Reverberations from one microphone to the other are cancelled by the use of first and second line echo cancellers. Each line echo canceller models the delay and transmission characteristics of the acoustic path between the first and second microphones.

The present invention is further embodied in an ear set to be worn in the outer ear. The ear set is a self-contained molded unit, with integral dual microphones, battery, ear canal speaker, signal processing electronics that is convenient to wear and will not interfere with communication between workers or physical activity while working.

In a first embodiment, a noise suppression system in accordance with the present invention acts as an ear protector, canceling substantially all or most of the noise striking the dual microphones of the ear set. In a second embodiment, a noise suppression system in accordance with the present invention acts a noise suppression communication system, suppressing background noise while allowing communication signals to be heard by the wearer.

DETAILED DESCRIPTION

Figure 1:
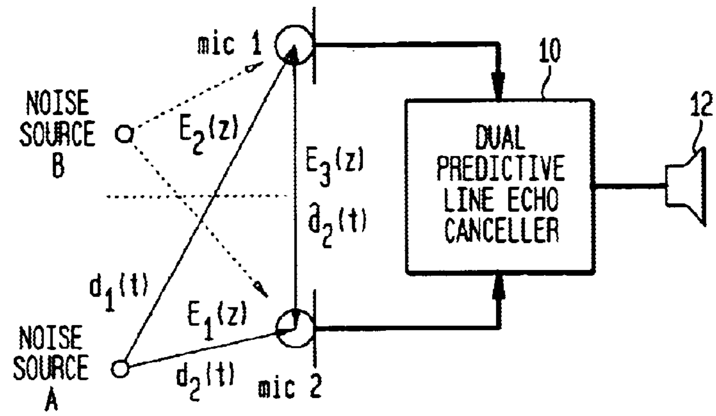
FIG. 1 is a block diagram of a dual echo predictive line canceller used in conjunction with the present invention.

FIG. 1 is a general purpose block diagram a dual microphone acoustic noise suppression (ANS) system. First and second microphones, mic1 and mic2, are coupled to a dual echo predictive line canceller 10. The concept of ANS is based on the cancellation of noise in one microphone by means of the other microphone. In the prior art, the electronic portion 10 of an ANS system was first developed using an analog system. Such systems were much too bulky to be fitted into an ear set.

Each noise source (A or B) projects a different direct sound wave along different paths to mic1 and mic2. The acoustic path from noise source A to mic1 is represented by a transfer function $E_2(z)$. The acoustic path from noise source A to mic2 is represented by a transfer function $E_1(z)$. Between mic1 and mic2 the acoustic path is represented by a transfer function $E_3(z)$.

Figure 2:
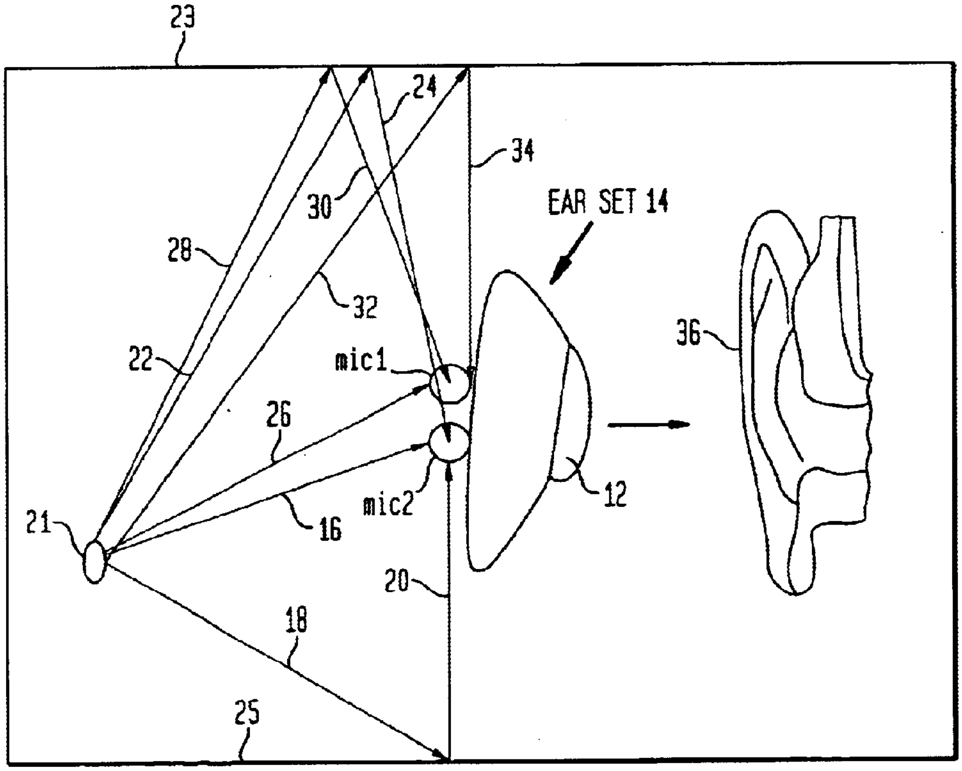
FIG. 2 is a pictorial representation of the sound field reaching an ear set in accordance with the present invention intended to be worn in the human ear.

FIG. 2 shows an ear set 14 embodying the present invention. The ear set 14 contains an ear canal speaker 12, which is coupled to the human ear 36. The ear set 14 further includes a pair of microphones, mic1 and mic2 closely mounted on the ear set 14. Sound from a given source 21 reaches mic1 and mic2 by direct paths 26, 16 respectively. Sound from source 21 also reaches mic1 by various reflecting paths. In particular, a sound wave 28 reflecting off a neighboring wall 23 reaches mic1 as a reflected sound wave 30. In addition, a sound wave 32 reflecting off a neighboring wall 23 reaches mic1 as a reflected sound wave 34.

With respect to mic2, sound from the source 21 arrives via a variety of paths. In particular, a sound wave 22 reflecting off a neighboring wall 23 reaches mic2 as a reflected sound wave 24. Yet another sound wave 20 from a different direction arrives at mic2 via a sound wave 18 reflected off an opposite wall 25. Thus, the sound fields at mic1 and mic2 contain a complex mixture of the original sound with many echoes.

Figure 3:
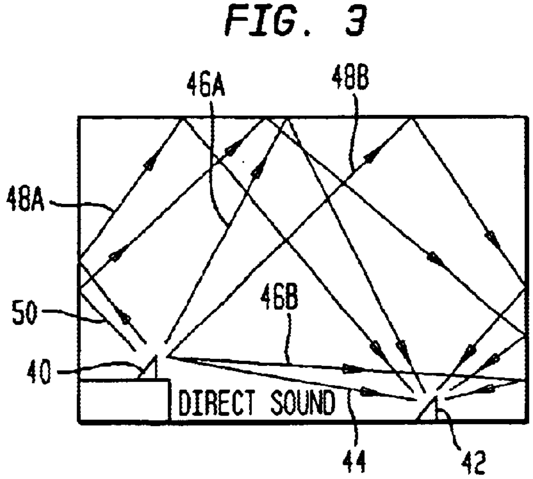
FIG. 3 is a pictorial representation of the reverberation noise field in confined spaces.

The situation in a confined space is illustrated further in FIG. 3 in which a sound source 40 includes a direct path 44 and a plurality of reflecting paths such as 46A, 46B, 48A, 48B and 50, known as reverberation (or reverberating) noise.

Figure 4:
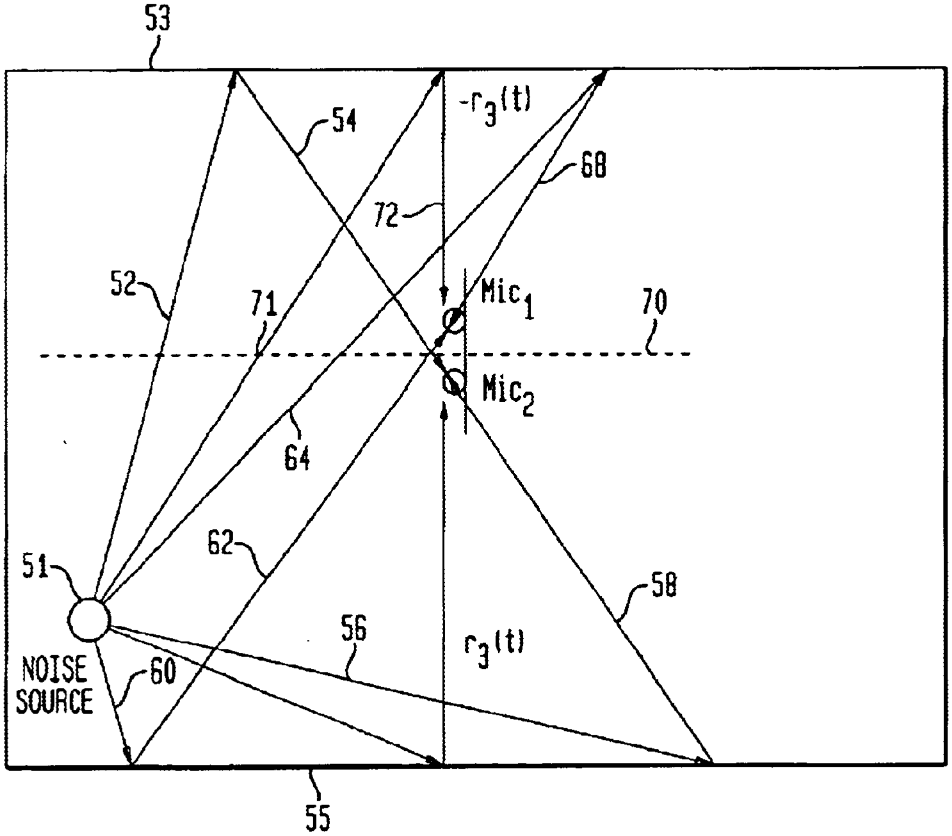
FIG. 4 is a diagram illustrating the various paths that reverberation sound reaches the dual microphones of a noise suppression system in accordance with the present invention.

The relationship of the microphones to the ear set is illustrated in FIG. 4. For simplicity, FIG. 4 is a simplified representation to the model illustrated in FIG. 1 where mic1 acts as an echo source generator transmitting the signal toward mic2. The dual microphones mic1 and mic2 are fixed on the same axis 72 on either side of the ear set, perpendicular to a direct path 70 to the ear set.

In a homogeneous medium, each of the microphones will receive a reverberant sound. A sound wave 64 reflecting off a neighboring wall 53 reaches mic1 as a reflected sound wave 68, which tends to cancel a sound wave 60 reflecting off a neighboring wall 55 reaching mic1 as a reflected sound wave 62. Similarly, a sound wave 52 reflecting off a neighboring wall 53 reaches mic2 as a reflected sound wave 54, which tends to cancel a sound wave 56 reflecting off a neighboring wall 55 reaches mic2 as a reflected sound wave 58. All reverberant sound waves will tend to cancel each other at each microphone, except the reverberant sound wave $r_3(t)$ along the echo path from mic1 to mic2. The reverberant sound wave $r_3(t)$ captured by mic1 is out of phase with the reverberant sound wave $-r_3(t)$ captured by mic2.

Depending on the position of the noise source 51, the received direct sound by each microphone will be a delayed version of the other. The direct sound wave $d_1(t)$ at one microphone is a delayed version of the direct sound wave $d_2(t)$ at the other microphone. The direct sound wave received directly from the source will be substantially similar if the noise source 51 were relocated along the perpendicular axis 70, equidistant from the two microphones, i.e., $d_1(t)=d_2(t)$.

Figure 5:
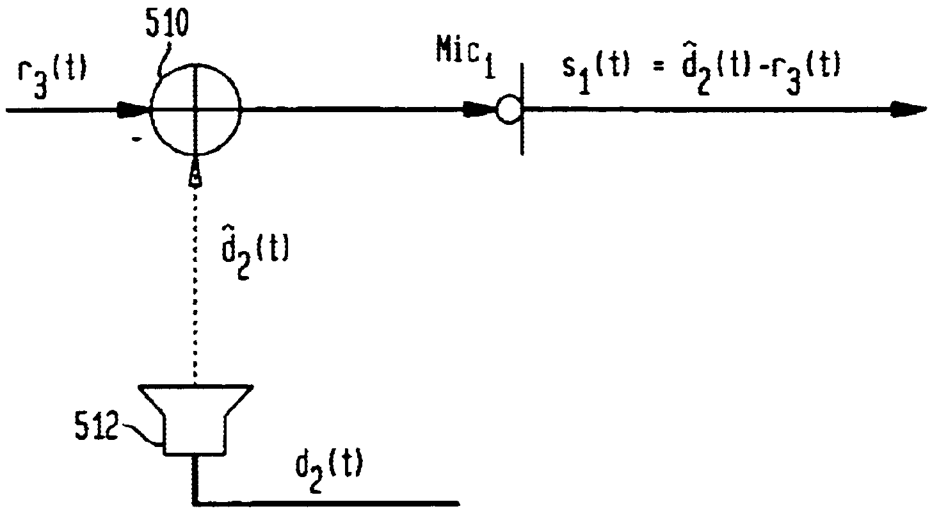
FIGS. 5 and 6 illustrate the reverberations between the dual microphones of the present invention.
Figure 6:
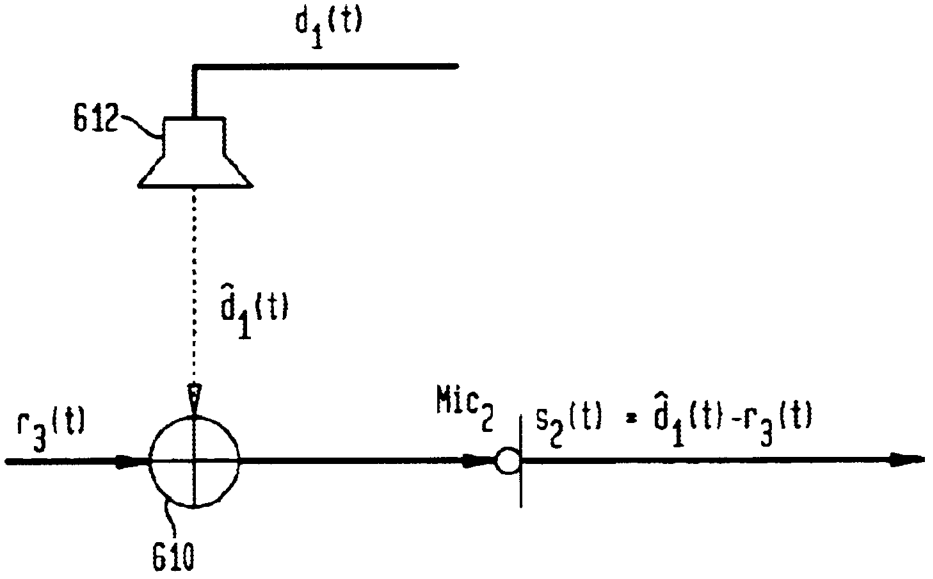

A simplified representation of the mutual echoes is illustrated in FIGS. 5 and 6. In FIG. 5, mic2 acts as an echo source generator 512 transmitting the noise signal $\hat{d}_2(t)$ toward mic1. In FIG. 6 the process is reversed, where mic1 is acting as an echo source generator transmitting noise signal $\hat{d}_1(t)$ toward mic2. A line echo canceller is implemented in order to duplicate the noise signal flowing through the inter-microphone acoustic path ($E_3$ in FIG. 1).

As indicated, the noise captured in mic2 includes the echo from mic1 and vise versa. Similar to the task to be performed by an echo canceller, $s_1(t)$ in FIG. 5 has a term to be cancelled: i.e., $\hat{d}_2(t)$ (the delayed version of $d_2(t)$ including some reverberations) by having an estimate of $d_2(t)$. Therefore, an Acoustic Noise Suppressor (ANS) and the Line Echo Canceller (LEC) share the common problem of finding the best estimate of the microphone to microphone echo path $E_3$ (in FIG. 1).

Figure 7A:
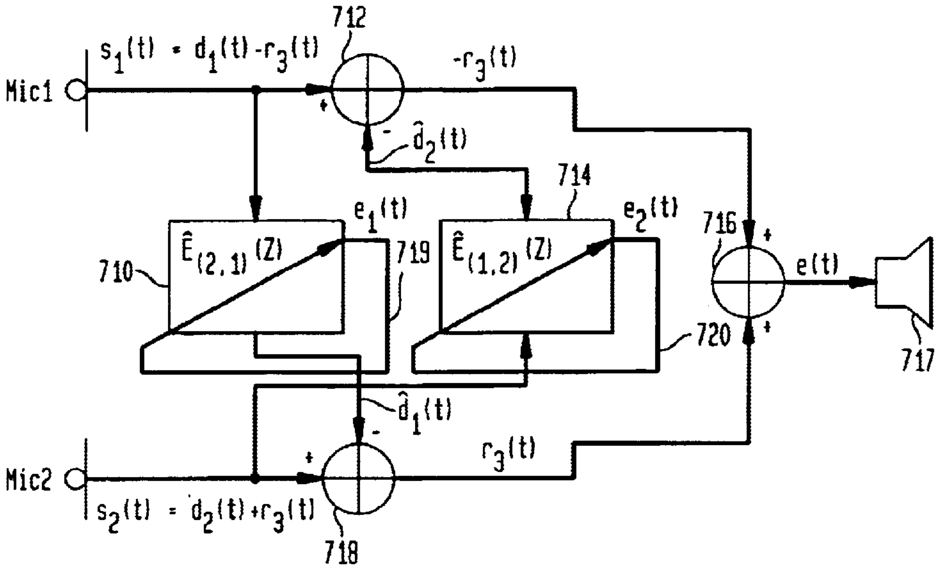
FIG. 7A is a dual echo line canceller embodying the present invention.

A noise suppression system formed by a pair of echo line cancellers for use in conjunction with the present invention is shown in FIG. 7A. Mic1 is coupled to a first echo prediction adaptive filter 710 and a first adder 712. Mic2 is coupled to a second echo prediction adaptive filter 714 a second adder 718. The output of the first adder 712 is used to subtract the predictive noise $\hat{d}_2(t)$ from $s_1(t)$. The output of the second adder 718 is used to subtract the predictive noise $\hat{d}_1(t)$ from $s_2(t)$. The residual error terms at the respective outputs of the first and second adders 712, 718 are summed in adder 716 to drive the output speaker 717. Suitable analog to digital converters (not shown) sample the microphones at a 48 kHz sampling rate.

Figure 7B:
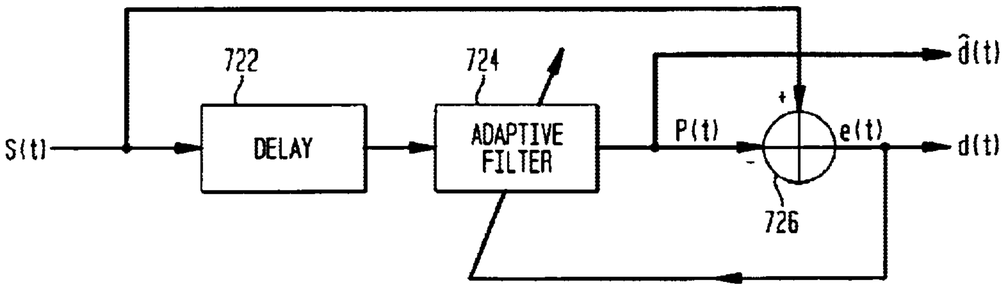
FIG. 7B is a block diagram of an echo prediction circuit for the dual echo line canceller of FIG. 7A in accordance with the present invention.

The echo prediction filters 710 and 714 are shown in further detail in FIG. 7B. Each echo prediction filter takes an input signal s(t) and subtracts (in adder 726) a delayed filtered 724 version p(t) of the input signal s(t). The delay 722 is selected to be equal to the acoustic delay between mic1 and mic2. The filtered version of the input signal is obtained by use of an adaptive filter 724. The delayed and filtered signal p(t) is subtracted in adder 726 (subtraction by signed addition). The difference is the error signal e(t) used to adjust the adaptive filter 724 coefficients. At convergence, the adaptive filter 724 models the transfer function $E_3(z)$of the acoustic path between mic1 and mic2, in order to generate the predictive noise term, $\hat{d}_2(t)$.

Adaptive filtering is a well-known technique useful in many signal processing applications. Adaptive filters are typically used in a closed loop system in which some measure of error (an error term) is to be minimized. An adaptive filter has an input terminal, an output terminal and an error terminal. Adaptive filters internally implement a suitable algorithm (responsive to the error input) to adjust the parameters of the adaptive filter so as to minimize the error term.

The filtered least means-square error (LMS) algorithm is a well-known method for adapting a filter. The LMS algorithm is simple and robust, has been widely adopted in many applications. Typically, an adaptive filter is implemented using a finite impulse response (FIR) filter using a digital tapped delay line with adjustable filter coefficients. The LMS algorithm is used to adjust the values of the filter coefficients responsive to an error input. In the present invention, the adaptive filters are used in a closed loop feedback system in which the adaptive filters are adjusted to model the characteristics of the acoustic path between mic1 and mic2. In this sense, the implementation of each half of FIG. 7A is like a telephone line echo canceller which compensates for the acoustic path coupling between the microphone and ear piece of a telephone handset.

In operation in FIG. 7, the parameters of the adaptive filter 710 are set to an initial estimate. To the extent that the output of the adaptive filter 710 is not equal to the delayed version of the same signal, an error term $e_1(t)$ at the output 719 is fed back to adjust the adaptive filter 710. After successive iterations, the parameters of the adaptive filter 710 are adjusted so as to minimize the error term at the output 719.

Similarly, the parameters of the adaptive filter 714 are set to an initial estimate. To the extent that the output of the adaptive filter 714 is not equal to the delayed version of the same signal, an error term $e_2(t)$ at the output 720 is fed back to adjust the adaptive filter 714. After successive iterations, the parameters of the adaptive filter 714 are adjusted so as to minimize the error term at the output 720.

Each microphone signal mic1, mic2 is used by each respective adaptive filter 714, 710 to generate a replica of the echo called $\hat{d}(t)$, which is subtracted from the other microphone signal (including the echo). The echo canceller generates the echo replica by applying the reference signal to an adaptive filter (tapped-delay-line), as shown. At convergence, the adaptive filter's transfer function is identical to that of the echo path between the two microphones.

The convergence and the stability of the system relies on the stability of the two line echo cancellers. The choice of a value for the step size parameter $\mu$ (used in the known LMS algorithm) is important for stability. A sufficient condition for convergence of the LEC algorithm is given by:

$$0 < \mu < \frac{2}{\lambda_{\max}(R_{xx})}, \tag{20}$$

where $\lambda_{max}$ is the largest eigenvalue of the autocorrolation matrix.

The system of FIG. 7A will tend to cancel all noise without discriminating between unwanted sounds (background noise) and wanted sounds (speech). For any wanted disturbances (e.g., speech), a speech detector is utilized (not shown).

Detailed Embodiment of the Invention

Figure 8:
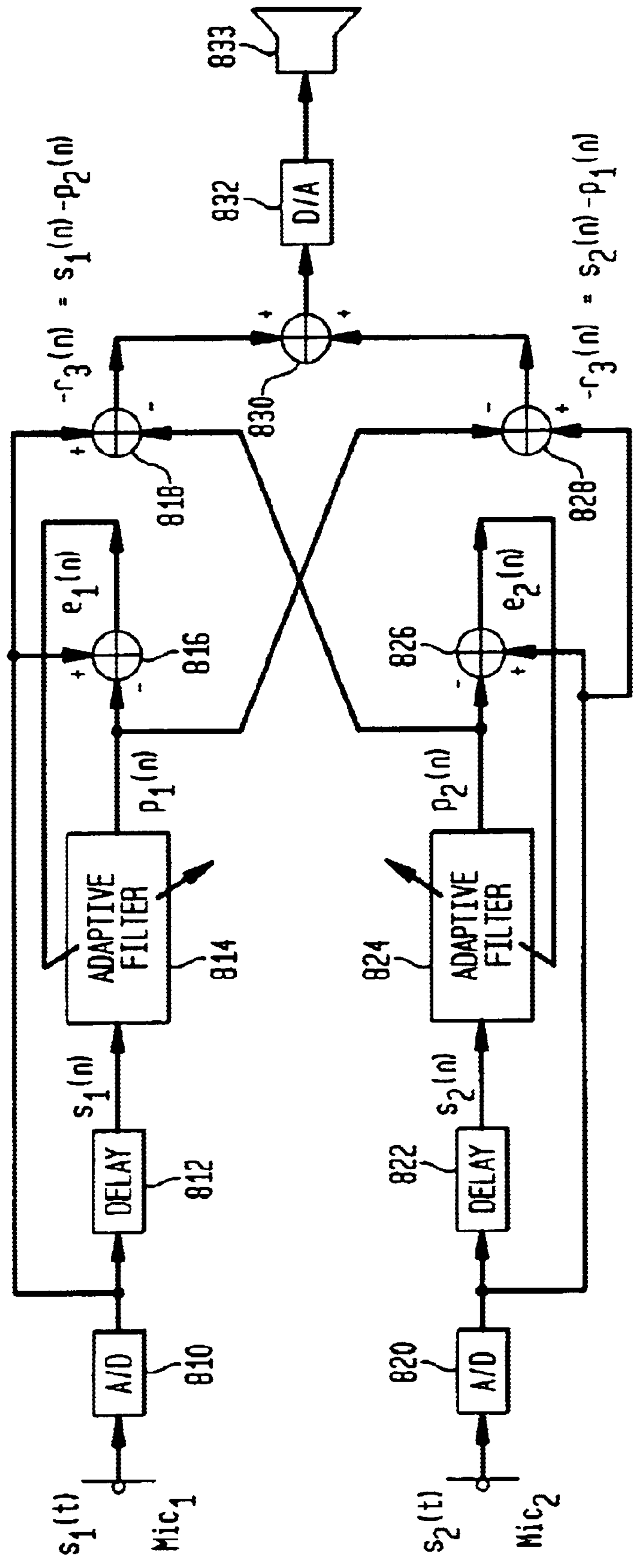
FIG. 8 is a noise suppression system in accordance with a first embodiment of the present invention.

In FIG. 8, the detailed version of FIG. 7A is an approach for canceling the echo in each microphone uses dual prediction circuits to predict the echoes $p_1(n)$ and $p_2(n)$. In particular, a delay element 812, an adaptive filter 814 and an adder 816 form a first predictor circuit to predict $p_1(n)$ from mic1 (via analog to digital converter 810). Similarly, a delay element 822, an adaptive filter 824 and an adder 826 form a second predictor circuit to predict $p_2(n)$ from mic2. (via analog to digital converter 820). The output is formed by adders 818, 828 and 830 which drive the speaker 833 via a digital to analog converter 832.

To predict the echo from mic2 received by mic1, a delayed 812 version of the mic1 signal is processed in an adaptive filter 814 and subtracted 816 from the signal from mic1. The delay 812 is set equal to the acoustic delay between mic1 and mic2. At convergence, the parameters of the adaptive filter 814 have been adjusted so as to model the transmission characteristics of the acoustic path between mic2 and mic1. Once having a predicted value for the echo from each microphone, each echo $p_1(n)$, $p_2(n)$ is subtracted 828, 818 from the signal $s_2(n)$, $s_1(n)$ received from the other microphone. Specifically, the predicted value of the mic2 echo $p_1(n)$ in mic1 is then subtracted 828 from the mic2 signal. Similarly, the predicted value of the mic1 echo $p_2(n)$ in mic2 is then subtracted 818 from the mic1 signal.

In operation, an A/D converter 810 converts the signal from mic1 to digital form, which is then delayed in delay element 812. The preset value of the delay 812 is a function of the spacing between microphone mic1 and microphone mic2. The delay value is set equal to the time it takes a sound wave to travel between mic1 and mic2. The delayed signal from mic1 is processed in an adaptive filter 814, which simulates the transfer characteristics of the acoustic path from mic1 to mic2. The output of the adaptive filter 814 is subtracted 816 (using a signed addition convention for subtraction) from the mic1 signal. To the extent that the error $e_1(n)$ is not equal to zero at the output of adder 816, the coefficients of the adaptive filter 814 are adjusted using the LMS algorithm. At convergence, the output of the adaptive filter 814 is $p_1(n)$, a predicted (delayed) version of the echo at mic2 received from mic1.

The predicted value of the echo from mic1, $p_1(n)$, is subtracted from the signal from mic2 in adder 828 (using a signed addition convention for subtraction). In such manner, the (predicted) echo from mic1 arriving at mic2 is subtracted (cancelled) from the mic2 signal, and appears at the output of adder 828.

The operation of the second prediction circuit is similar. Specifically, A/D converter 820 converts the signal from mic2 to digital form, which is then delayed in delay element 822. The preset value of the delay 822 is also a function of the spacing between microphone mic1 and microphone mic2 and is set to the same delay value as delay 812. The delayed signal from mic2 is processed in an adaptive filter 824, which simulates the transfer characteristics of the acoustic path from mic2 to mic1. The output of the adaptive filter 824, is subtracted 826 (using a signed addition convention for subtraction) from the mic2 signal. To the extent that the error $e_2(n)$ is not equal to zero at the output of adder 826, the coefficients of the adaptive filter 824 are adjusted using the LMS algorithm. At convergence, the output of the adaptive filter 824 is $p_2(n)$, a predicted (delayed) version of the echo at mic1 received from mic2.

The predicted value of the echo from mic2, $p_2(n)$, is subtracted from the signal from mic1 in adder 818 (using a signed addition convention for subtraction). In such manner, the (predicted) echo from mic2 arriving at mic1 is subtracted (cancelled) from the mic1 signal, and appears at the output of adder 818.

The outputs of adders 818 and 828 are summed in adder 830 and form the signal output to drive speaker 833. The circuit of FIG. 8 is a noise suppression system used primarily for ear protection. Substantially all noise will tend to be cancelled.

Speech Communication System

Figure 9:
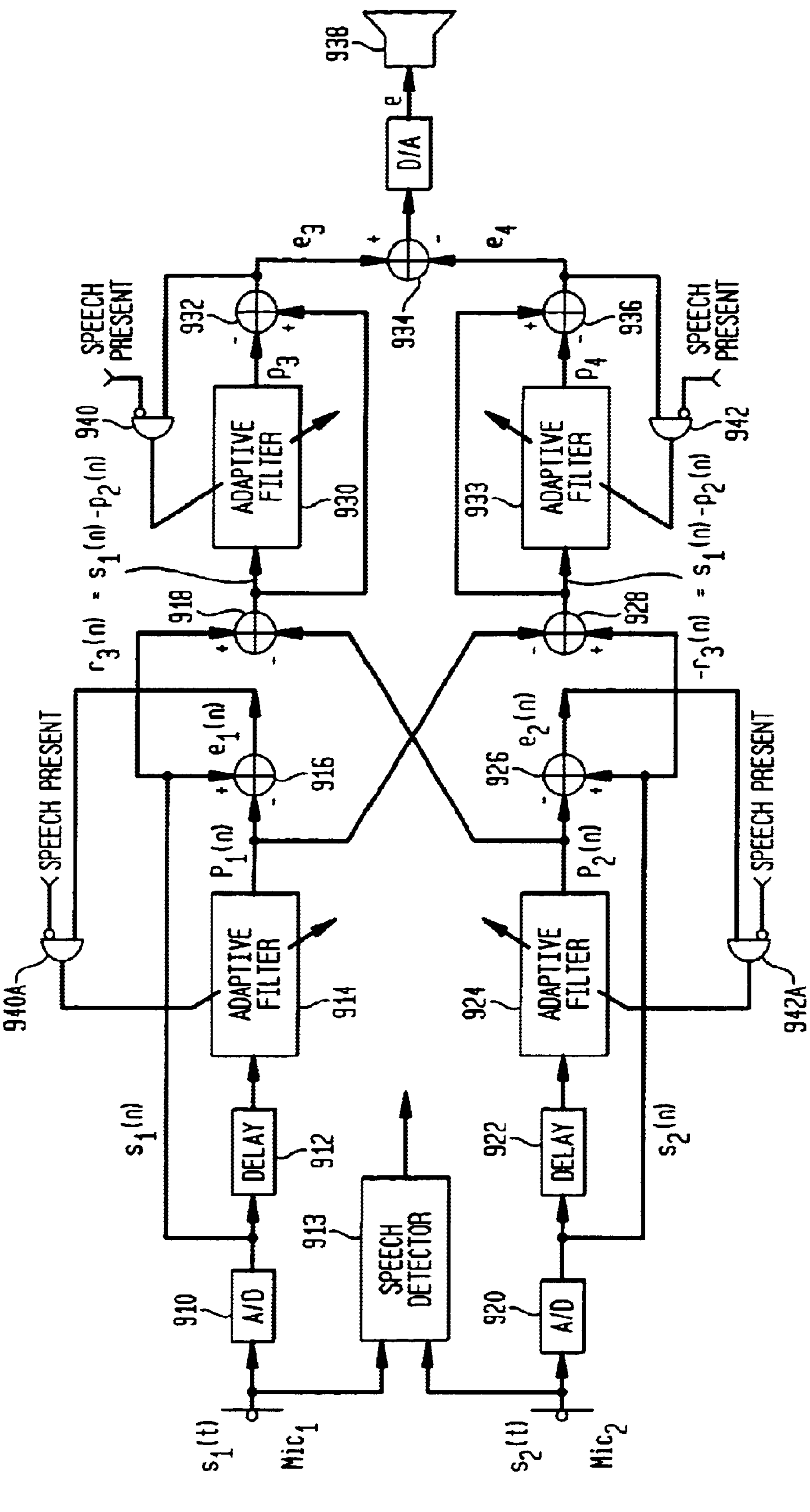
FIG. 9 is a noise suppression communication system in accordance with a second embodiment of the present invention.
Figure 10:
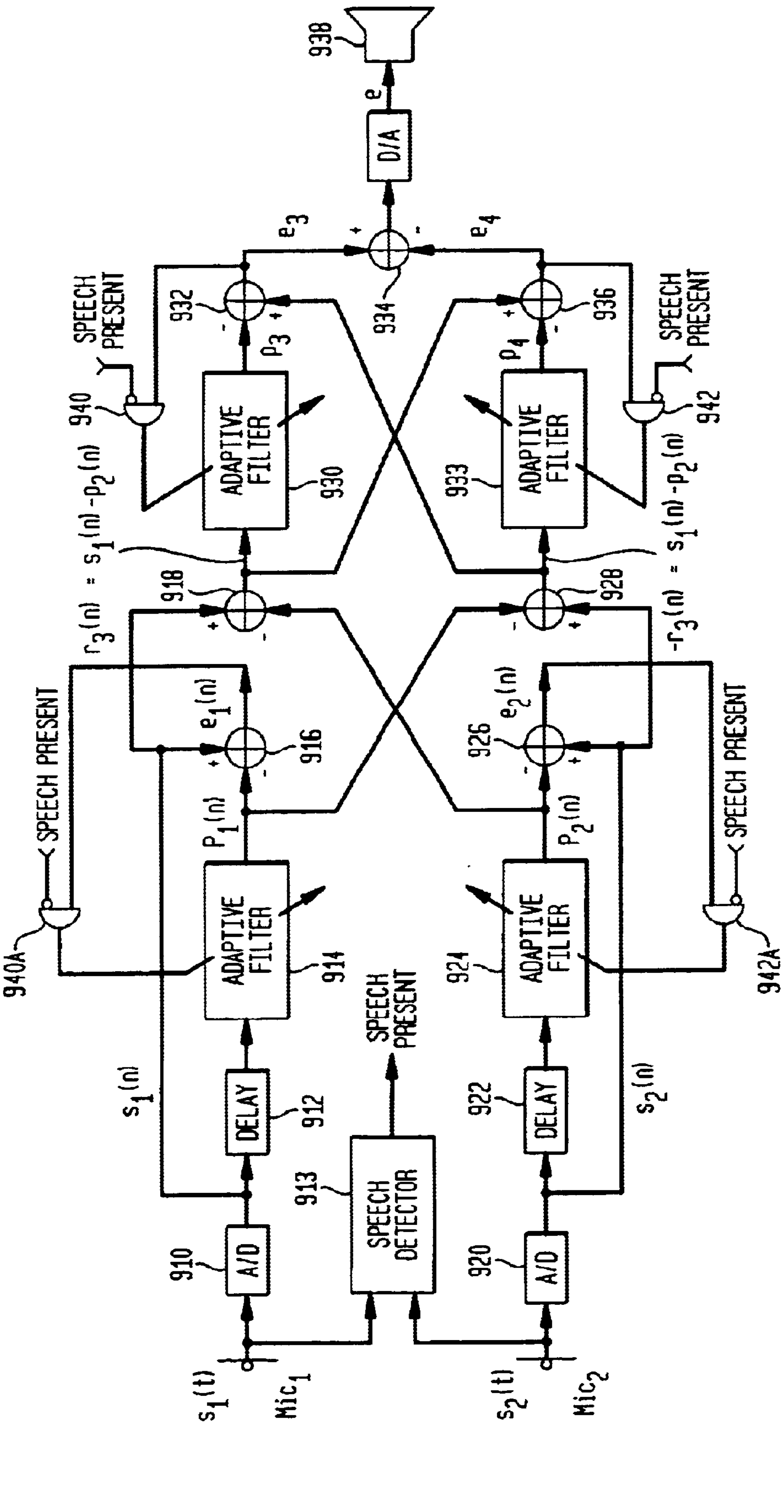
FIG. 10 is an alternate scheme for a noise suppression system in accordance with a second embodiment of the present invention.

A noise suppression system that allows speech signals to be heard while suppressing background noise is shown in FIGS. 9 and 10. The noise suppression stage, which consists of dual prediction circuits and adders, is analogous to the noise suppression circuit shown in FIG. 8. In particular, respective A/D converters 910, 920, delay elements 912, 922, adaptive filters 914, 924 and adders 916, 926, 918, 928 in FIG. 9 are connected and operate in the same manner as the corresponding A/D converters 810, 820, delay elements 812, 822, adaptive filters 814, 824 and adders 816, 826, 818, 828 in FIG. 8. The noise suppression circuit is adaptive so long as the speech detector 913 does not detect speech. While speech is not present, respective AND gates 940A, 940 couple the respective error signal outputs of adders 916, 926 to update the adaptive filter coefficients of the adaptive filters 914, 924.

The output of adders 918 and 928 are connected to the input of a speech processing stage. The speech processing stage consists of two adaptive filters 930, 933, adders 932, 936 and 934 and AND gates 940 and 942. In FIG. 9, the speech processing stage conditions speech in independent adaptive filters 930, 933 before combining the processed speech signals in adder 934. FIG. 10 shows an alternate embodiment of the speech processing stage. In FIG. 10 the operation of the adaptive filters 930, 933 are interrelated. In particular, the adaptive filters 930, 933 are cross coupled by connecting the output of adder 928 to the input of adder 932 (FIG. 10) instead of to the input of adder 936 (FIG. 9). Similarly, in FIG. 10 the adaptive filters 930, 933 are cross coupled by connecting the output of adder 918 to the input of adder 936 (FIG. 10) instead of to the input of adder 932 (FIG. 9).

A speech detector 913 coupled to mic1 and mic2 indicates when speech is present in the background noise. There are many known techniques to implement the speech detector 913, including methods based frequency spectrum analysis, or time domain analysis. The output of adder 918 is coupled to a first adaptive filter 930 and a first adder 932. The output of adder 928 is coupled to a second adaptive filter 933 a second adder 936. The output of the first adder 936 is used as the error term $e_4$ to adjust the parameters of the second adaptive filter 933 via AND gate 942. The other input of AND gate 942 is coupled to the signal that indicates speech is present. The output of the second adder 932 is used as the error term $e_3$ to adjust the parameters of the first adaptive filter 930 via AND gate 940. The other input of AND gate 940 is coupled to the signal that indicates speech is present.

The residual error terms $e_3$ and $e_4$ at the respective outputs of the first and second adders 936, 932 are subtracted in adder 934 to drive the output speaker 938. The speech processing stage enhances the resulting speech signal by taking the difference ($e_3$ minus $e_4$) between the two adder outputs 932, 936. A suitable digital to analog converter converts the output of adder 934 to drive a speaker 938.

In operation, when speech is not present, AND gates 940, 940A, 942, 942A permit each respective adaptive filter 930, 914, 933, 924 to use each respective error signal to update the respective coefficients. The adaptive filters 930, 914, 933 and 924 are continuously adjusted to cancel all sound as noise. As a result, input noise is cancelled by operation of the circuit. However, in order not to cancel the desired speech signal, the AND gates 940, 940A, 942, 942A are responsive to a speech present indication from the speech detector 913, to suspend the update error function. In other words, when speech is present, the adaptive filters are "frozen" and do not adapt to cancel the desired speech signal.

When speech is detected, the AND gates 940, 940A, 942, 942A force the adaptive filters 930, 914, 933, 924 to stop adapting respective filter coefficients and keep the computed values equal to the values computed just prior to detection of speech. With the adaptive filter coefficients frozen, the subsequent speech is the error signal. Assuming that the background noise does not materially change while speech is present, the system output from the D/A converter to the speaker 938 is substantially equal to the input speech signal with the background noise suppressed.

What is claimed is:

1. In a communication system having first and second microphones for receiving an acoustic signal and a speaker for generating acoustic signals, a method for suppressing acoustic noise received by said first and second microphones, said method comprising:

- receiving a first signal from said first microphone;
- receiving a second signal from said second microphone;
- processing said first signal in a first adaptive filter to provide a first predicted echo signal;
- subtracting said first predicted echo signal from said first signal to provide a first adaptive filter control signal, said first adaptive filter being responsive to said first adaptive filter control signal to adapt the parameters of said first adaptive filter;
- subtracting said first predicted echo signal from said second signal to provide a first reverberation signal;
- processing said second signal in a second adaptive filter to provide a second predicted echo signal;
- subtracting said second predicted echo signal from said second signal to provide a second adaptive filter control signal, said second adaptive filter being responsive to said second adaptive filter control signal to adapt the parameters of said second adaptive filter;
- subtracting said second predicted echo signal from said first signal to provide a second reverberation signal; and
- subtracting said first reverberation signal and said second reverberation signal to form an output signal to said speaker, whereby acoustic noise received by said first and second microphones is substantially suppressed.

2. A method in accordance with claim 1, wherein said step of processing said first signal in a first adaptive filter to provide said first predicted echo signal, further includes the step of delaying said first signal by an amount substantially equal to the time delay of an acoustic wave traveling from said second microphone to said first microphone.

3. A method in accordance with claim 2, wherein said step of processing said first signal in a first adaptive filter to provide said first predicted echo signal, further includes the step of adjusting said first adaptive filter to have substantially the same transfer characteristics as the acoustic path from said second microphone to said first microphone.

4. A method in accordance with claim 3, wherein said step of processing said second signal in a second adaptive filter to provide said second predicted echo signal, further includes the step of delaying said second signal by an amount substantially equal to the time delay of an acoustic wave traveling from said first microphone to said second microphone.

5. A method in accordance with claim 4, wherein said step of processing said second signal in a second adaptive filter to provide said second predicted echo signal, further includes the step of adjusting said second adaptive filter to have substantially the same transfer characteristics as the acoustic path from said first microphone to said second microphone.

6. A method in accordance with claim 1, further comprising:

- detecting the presence of speech responsive to first and second signals; and
- halting the operation of said first and second adaptive filters when speech is detected.

7. In a communication system having first and second microphones for receiving an acoustic signal and a speaker for generating acoustic signals, an apparatus for suppressing acoustic noise received by said first and second microphones, said apparatus comprising:

- means for receiving a first signal from said first microphone;
- means for receiving a second signal from said second microphone;
- means for processing said first signal in a first adaptive filter to provide a first predicted echo signal;
- means for subtracting said first predicted echo signal from said first signal to provide a first adaptive filter control signal, said first adaptive filter being responsive to said first adaptive filter control signal to adapt the parameters of said first adaptive filter;
- means for subtracting said first predicted echo signal from said second signal to provide a first reverberation signal;
- means for processing said second signal in a second adaptive filter to provide a second predicted echo signal;
- means for subtracting said second predicted echo signal from said second signal to provide a second adaptive filter control signal, said second adaptive filter being responsive to said second adaptive filter control signal to adapt the parameters of said second adaptive filter;
- means for subtracting said second predicted echo signal from said first signal to provide a second reverberation signal; and
- means for subtracting said first reverberation signal and said second reverberation signal to form an output signal to said speaker, whereby acoustic noise received by said first and second microphones is substantially suppressed.

8. An apparatus in accordance with claim 7, wherein said means for processing said first signal in a first adaptive filter to provide said first predicted echo signal, further includes delaying said first signal by an amount substantially equal to the time delay of an acoustic wave traveling from said second microphone to said first microphone.

9. An apparatus in accordance with claim 8, wherein said means for processing said first signal in a first adaptive filter to provide said first predicted echo signal, further includes adjusting said first adaptive filter to have substantially the same transfer characteristics as the acoustic path from said second microphone to said first microphone.

10. An apparatus in accordance with claim 9, wherein said means for processing said second signal in a second adaptive filter to provide said second predicted echo signal, further includes delaying said second signal by an amount substantially equal to the time delay of an acoustic wave traveling from said first microphone to said second microphone.

11. An apparatus in accordance with claim 10, wherein said means for processing said second signal in a second adaptive filter to provide said second predicted echo signal, further includes adjusting said second adaptive filter to have substantially the same transfer characteristics as the acoustic path from said first microphone to said second microphone.

12. An apparatus in accordance with claim 7, further comprising:

means for detecting the presence of speech responsive to first and second signals; and means for halting the operation of said first and second adaptive filters when speech is detected.

13. An apparatus for suppressing acoustic noise in a communication system having a speaker for generating acoustic signals, said apparatus comprising:

a first microphone;

a second microphone;

a first adaptive filter having an input terminal, an output terminal, and a control terminal, said input terminal being coupled to said first microphone;

a first adder having first and second input terminals and an output terminal, said first input terminal being connected to said output terminal of said first adaptive filter, said second input terminal being coupled to said first microphone and said output terminal of said first adder being connected to said control terminal of said first adaptive filter;

a second adaptive filter having an input terminal, an output terminal and a control terminal, said input terminal being coupled to said second microphone;

a second adder having first and second input terminals and an output terminal, said first input terminal being connected to said output terminal of said second adaptive filter, said second input terminal being coupled to said second microphone and said output terminal of said second adder being connected to said control terminal of said second adaptive filter;

a third adder having first and second input terminals and an output terminal output, said first input terminal of said third adder being connected to said output terminal of said first adaptive filter and said second input terminal of said third adder being coupled to said second microphone;

a fourth adder having first and second input terminals and an output terminal, said first input terminal of said forth adder being connected to said output terminal of said second adaptive filter and said second input terminal of said fourth adder being coupled to said first microphone; and a fifth adder having first and second input terminals and an output terminal, said first terminal of said fifth adder being coupled to the output terminal of said third adder, said second terminal of said fifth adder being coupled to the output terminal of said fourth adder and said out put terminal of said fifth adder being coupled to said speaker, whereby acoustic noise received by said first and second microphones is substantially suppressed.

14. An apparatus in accordance with claim 13, further comprising a first delay element having respective input and output terminals wherein said first terminal of said first delay element is coupled to said first microphone and said output terminal of first delay element is connected to said input terminal of said first adaptive filter.

15. An apparatus in accordance with claim 14, wherein said first adaptive filter is adjusted to have substantially the same transfer characteristics as the acoustic path from said second microphone to said first microphone.

16. An apparatus in accordance with claim 15, further comprising a second delay element having respective input and output terminals wherein said first terminal of said second delay element is coupled to said first microphone and said output terminal of second delay element is connected to said input terminal of said first adaptive filter.

17. An apparatus in accordance with claim 16, wherein said second adaptive filter is adjusted to have substantially the same transfer characteristics as the acoustic path from said first microphone to said second microphone.

18. An apparatus in accordance with claim 13, further comprising:

a speech detector coupled to said first and second microphones for detecting the presence of speech; and said first and second adaptive filters being responsive to said speech detector for halting the operation of said first and second adaptive filters when speech is detected.

19. An apparatus in accordance with claim 13, wherein said first terminal of said fifth adder is coupled to the output of said third adder through a third adaptive filter, and said second terminal of said fifth adder is coupled to the output of said fourth adder through a fourth adaptive filter.

* * * * *